United States Patent
Koparde

(10) Patent No.: US 12,124,723 B2
(45) Date of Patent: Oct. 22, 2024

(54) TECHNIQUES FOR DATA TRANSFER OPERATIONS

(71) Applicant: Micron Technology, Inc., Boise, ID (US)

(72) Inventor: Jotiba Koparde, Bangalore (IN)

(73) Assignee: Micron Technology, Inc., Boise, ID (US)

(*) Notice: Subject to any disclaimer, the term of this patent is extended or adjusted under 35 U.S.C. 154(b) by 142 days.

(21) Appl. No.: 17/729,837

(22) Filed: Apr. 26, 2022

(65) Prior Publication Data

US 2023/0342060 A1 Oct. 26, 2023

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/0644* (2013.01); *G06F 3/0673* (2013.01)

(58) Field of Classification Search
CPC .... G06F 3/0647; G06F 3/0604; G06F 3/0644; G06F 3/0673
See application file for complete search history.

(56) References Cited

U.S. PATENT DOCUMENTS

| | | | |
|---|---|---|---|
| 10,410,732 B1* | 9/2019 | Eliash | G11C 29/025 |
| 2013/0282967 A1* | 10/2013 | Ramanujan | G06F 12/0246 |
| | | | 711/114 |
| 2016/0283129 A1* | 9/2016 | Wang | G06F 3/0617 |
| 2017/0168929 A1* | 6/2017 | Kanno | G06F 12/0246 |
| 2018/0059958 A1* | 3/2018 | Ryan | G11C 11/4096 |
| 2018/0150261 A1* | 5/2018 | Nam | G06F 3/0688 |
| 2018/0157427 A1* | 6/2018 | Hong | G06F 3/0679 |
| 2019/0056888 A1* | 2/2019 | Kwon | G06F 3/0659 |
| 2020/0349090 A1* | 11/2020 | Davis | G06F 3/0649 |
| 2021/0034298 A1* | 2/2021 | Yoon | G06F 3/0611 |
| 2021/0181952 A1* | 6/2021 | Han | G06F 3/0679 |
| 2022/0375531 A1* | 11/2022 | Ock | G11C 16/3418 |
| 2023/0176965 A1* | 6/2023 | Bhardwaj | G06F 12/1009 |
| | | | 711/154 |
| 2023/0305738 A1* | 9/2023 | Bi | G06F 12/10 |
| | | | 711/154 |

* cited by examiner

*Primary Examiner* — John A Lane
(74) *Attorney, Agent, or Firm* — Holland & Hart LLP

(57) ABSTRACT

Methods, systems, and devices for techniques for data transfer operations are described. A memory system may select a source set of memory cells and a destination set of memory cells using one or more counters corresponding to access operations for the source and the destination. For example, as part of a data transfer operation, the memory system may prioritize transferring data from a block with a lower quantity of read operations to a block with a lower quantity of access operations. In some cases, the memory system may prioritize transferring data from a page with a lower quantity of read operations to a page with a slower read duration.

23 Claims, 7 Drawing Sheets

TECHNIQUES FOR DATA TRANSFER OPERATIONS

FIELD OF TECHNOLOGY

The following relates to one or more systems for memory, including techniques for data transfer operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Some memory systems may perform a data transfer operation, such as a folding operation, to transfer data from a first type of memory cell block, such as a single level cell (SLC) block, to a second type of memory cell block, such as a multiple level cell block (e.g., a multi-level cell (MLC) block, a triple-level cell (TLC) block, or a quad level cell (QLC) block). For example, the memory system may initially store data from a host system in SLC blocks. As the SLC blocks of the memory system become full or closer to full, the memory system may trigger the data transfer operation to transfer data from filled SLC blocks to multiple level cell blocks, and accordingly free up space to store additional data from the host device. However, memory systems may not consider factors such as data temperature (e.g., how often data is accessed), data sensitivity, intended retention life of data, other factors, or a combination thereof, in performing the data transfer operation. Accordingly, some memory systems may transfer hot data (e.g., frequently accessed data) prior to transferring cold data (e.g., infrequently accessed data), among other drawbacks. Because access operations for data stored in an SLC block are generally more efficient (e.g., consume fewer system resources such as time or power) than access operations for data stored in a multiple level cell block, such memory systems may inefficiently perform data transfer operations. Accordingly, efficient techniques to perform a data transfer operation are desired.

As described herein, a memory system may select a source set of one or more memory cells and a destination set of one or more memory cells using one or more counters corresponding to access operations for the source and the destination. For example, as part of a data transfer operation, the memory system may prioritize transferring data from an SLC block having been subject to a lower quantity of read operations to a multiple level cell block with a lower quantity of access operations. In some cases, the memory system may select a source and destination set of memory cells (e.g., one or more memory cells) on a page level of granularity. For example, the memory system may prioritize transferring data from a page with a lower quantity of read operations to a page with a slower read duration. That is, the memory system may transfer colder data (e.g., data accessed less frequently, data accessed with a frequency below a threshold) prior to transferring hot data (e.g., data accessed more frequently, data accessed with a frequency above a threshold), which will increase system efficiency by reducing overhead associated with accessing hot data (e.g., by retaining the hot data in higher efficiency SLC blocks).

Figure 1:
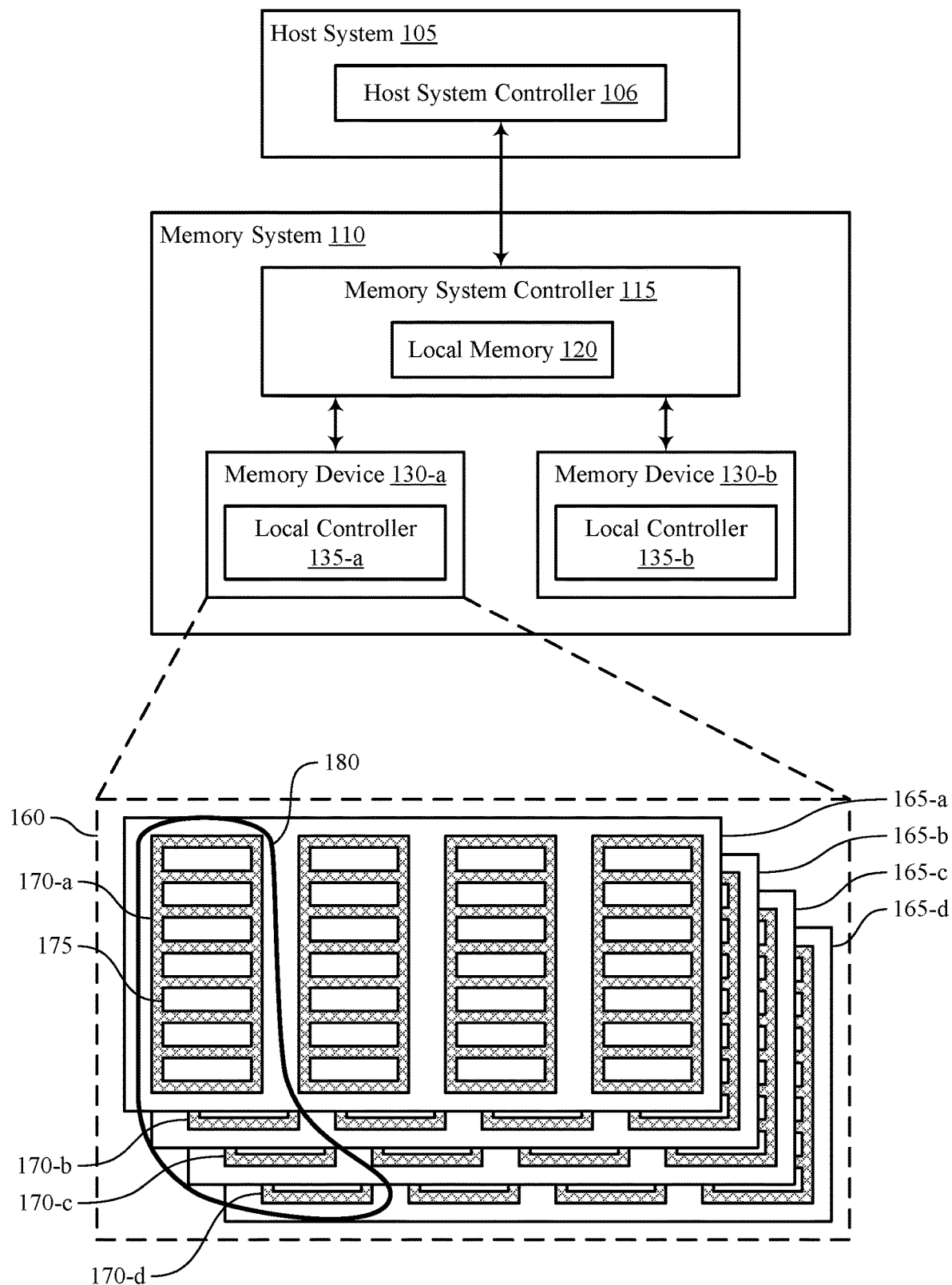
FIG. 1 illustrates an example of a system that supports techniques for data transfer operations in accordance with examples as disclosed herein.
Figure 2:
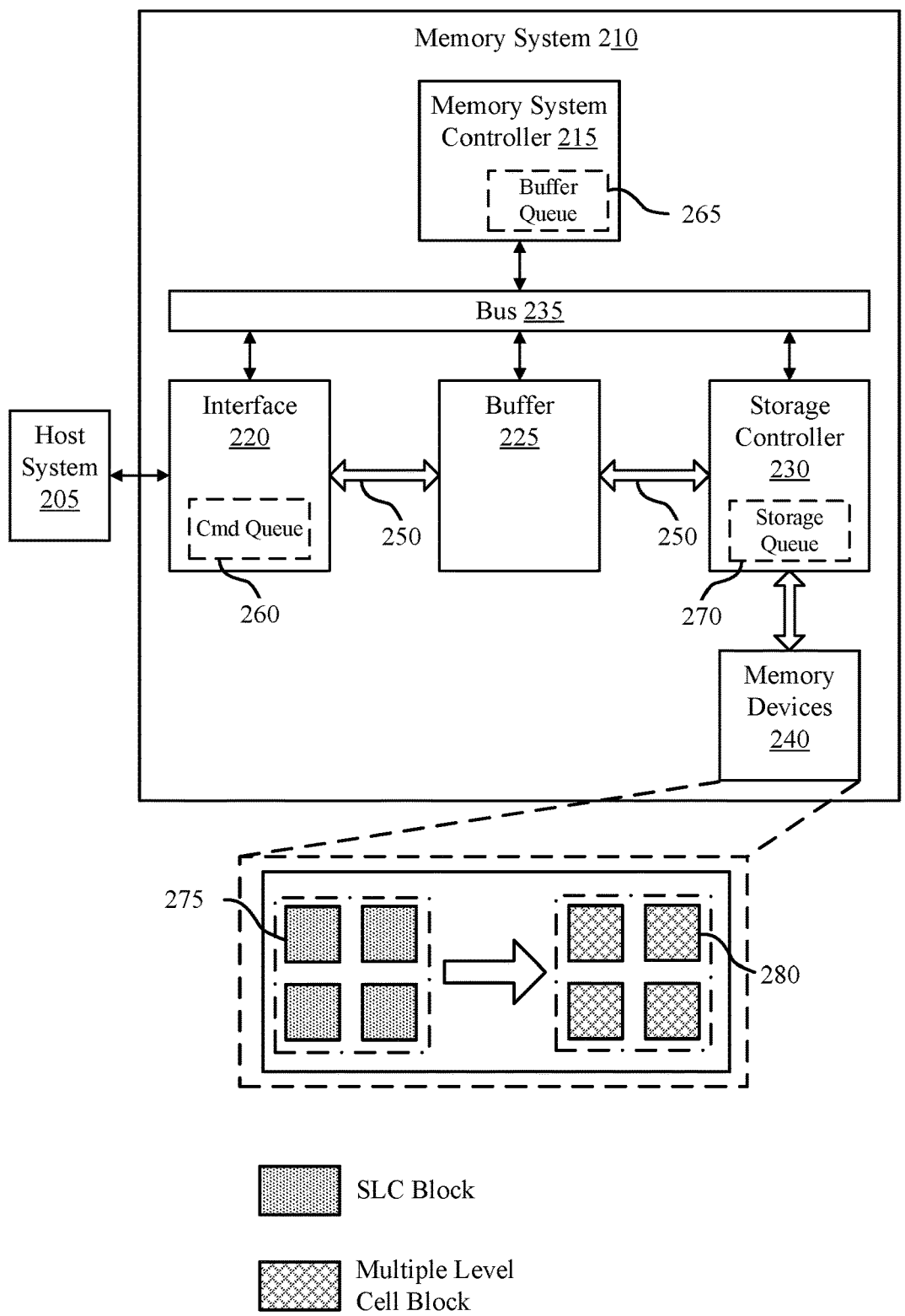
FIG. 2 illustrates an example of a system that supports techniques for data transfer operations in accordance with examples as disclosed herein.

Features of the disclosure are initially described in the context of systems, devices, and circuits with reference to FIGS. 1 through 2. Features of the disclosure are described in the context of a process flow with reference to FIG. 3. These and other features of the disclosure are further illustrated by and described in the context of an apparatus diagram and flowchart that relate to techniques for data transfer operations with reference to FIGS. 4-7.

FIG. 1 illustrates an example of a system 100 that supports techniques for data transfer operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for data transfer operations. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a memory system 110 may select a source set of memory cells and a destination set of memory cells using one or more counters corresponding to access operations for the source and the destination. For example, as part of a data transfer operation, the memory system 110 may prioritize transferring data from an SLC block 170 with a lower quantity of read operations to a multiple level cell block 170 with a lower quantity of access operations. In some cases, the memory system 110 may select a source and destination set of memory cells on a page level of granularity. For example, the memory system 110 may prioritize transferring data from a page 175 with a lower quantity of read operations to a page 175 with a slower read duration. That is, the memory system 110 may transfer cold data prior to transferring hot data, which may increase system efficiency by reducing overhead associated with accessing hot data (e.g., by retaining the hot data in higher efficiency SLC blocks 170).

FIG. 2 illustrates an example of a system 200 that supports techniques for data transfer operations in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on or in response to the communication from the interface 220. In some cases, the memory system controller 215 may determine that the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine whether the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine whether the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

The memory device 240 may include one or more blocks containing memory cells configured to store a variety of logic levels. For example, the memory device 240 may include one or more SLC blocks 275 and one or more multiple level cell blocks 280. Memory cells of an SLC block may be configured to store a single bit of data per memory cell, while memory cells of a multiple level block may be configured to store two or more bits of data per memory cell. For example, the multiple level cell block may be an example of a MLC block, a TLC block, or a QLC block.

In some cases, the memory system 210 may transfer data from an SLC block, which may be referred to as a source block, to a multiple level cell block, which may be referred to as a destination block, as part of a data transfer operation, such as a folding operation or a garbage collection operation. In such cases, the memory system 210 may select a source block from the one or more SLC blocks 275 using a first parameter associated with the source block and may select a destination block from the one or more multiple level cell blocks 280 using a second parameter or a set of parameters associated with the destination block.

For example, the first parameter may correspond to a value of a counter tracking a quantity of access operations, such as read operations, for each block of the one or more SLC blocks 275. The memory system 210 may include a separate or dedicated counter for each block of the one or more SLC blocks 275. In some cases, the memory system 210 may select a source block with a lower quantity of access operations of the one or more SLC blocks 275 (e.g., compared with other blocks of the one or more SLC blocks 275). Additionally or alternatively, the memory system 210 may select a source block with a corresponding counter value falling below a threshold.

In some, the second parameter may correspond to a value of a counter tracking a quantity of access operations, such as program and erase operations, for each block of the one or more multiple level cell blocks 280. The memory system 210 may include a separate or dedicated counter for each block of the one or more multiple level cell blocks 280. In some cases, the memory system 210 may select a destination block with a lowest quantity of access operations of the one or more multiple level cell blocks 280, Additionally or alternatively, the memory system 210 may select a destination block with a corresponding counter value falling below a threshold.

Additionally or alternatively, the second parameter may correspond to a read duration for each block of the one or more multiple level cell blocks 280. For example, the memory system may select a destination block with a faster read time (e.g., a lower read duration) compared with other blocks of the one or more multiple level cell blocks 280. In some cases, the read duration may correspond to or depend on a quantity or strobes or passes used to access a page of a block of the one or more multiple level cell blocks 280.

Figure 3:
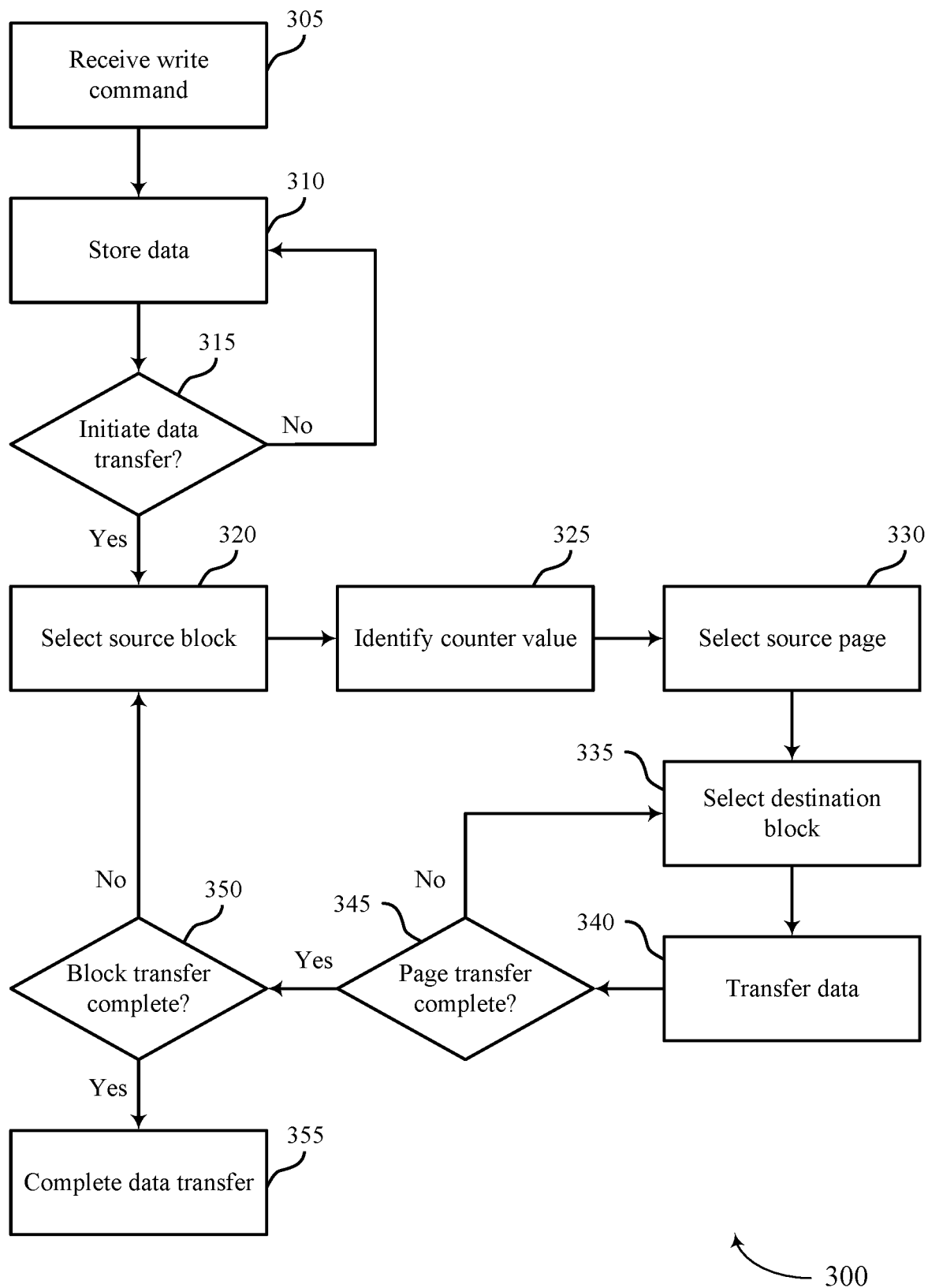
FIG. 3 illustrates an example of a process flow that supports techniques for data transfer operations in accordance with examples as disclosed herein.

FIG. 3 illustrates an example of a process flow 300 that supports techniques for data transfer operations in accordance with examples as disclosed herein. The process flow 300 may be implemented by a memory system, for example using a memory system controller, which may be examples of the memory system 110 or the memory system 210 and memory system controller 115 or the memory system controller 215 described with reference to FIGS. 1 and 2. In the following description of process flow 300, the operations may be performed in a different order than the order shown. For example, specific operations may also be left out of process flow 300, or other operations may be added to process flow 300.

The process flow 300 may illustrate an example of a data transfer operation in which the memory system selectively transfers data from a source set of memory cells (e.g., an SLC block or a page of an SLC block) to a destination set of memory cells (e.g., a multiple level cell block or a page of a multiple level cell block) using information such as a "temperature" of the transfer data, sensitivity of the transfer data, intended retention life of the transfer data, or a combination thereof.

In some cases, the "temperature" of data may correspond to how frequently the data is accessed. For example, the memory system may maintain a respective counter for each block of memory cells of the memory system which tracks the quantity of access operations performed on a respective counter. In some cases, the counter may individually track the quantity of read operations (e.g., a read count), the quantity of write or program operations, the quantity of erase operations, or any combination thereof. For example, the memory system may combine the quantity of program operations and the quantity of erase operations for a block into a combined value, such as a program erase count (PEC). A block with relatively a high quantity of access operations (e.g., indicating that the block may be frequently accessed) may correspond to a "hot" temperature, while a block with a relatively low quantity of access operations (e.g., indicating that the block may not be frequently accessed) may correspond to a "cold" temperature. Because the memory system may access data stored in an SLC block more efficiently (e.g., using fewer system resources, such as time and power consumption) than data stored in a multiple level cell block, the memory system may prioritize transferring cold data from a source block to a destination block as part of the data transfer operation.

In some cases, the memory system may maintain a counter tracking access operations at a page level of granularity. For example, the memory system may maintain a respective count of read operations, write operations, erase operations, or any combination thereof for each page of each block of the memory system. In some examples, the value of the counters may be maintained in a volatile portion of the memory system (e.g., in a buffer or other SRAM storage), and may be periodically transferred to a non-volatile portion of the memory system. Additionally or alternatively, the counters may be transferred to the non-volatile portion of the memory system as part of a power down procedure. Accordingly, if the memory system receives an access command from a host device, such as a read command, a write command, or an erase command, as part of performing the access command the memory system may increment the corresponding counter for a block of memory cells storing the data corresponding to the access command, a page of memory cells storing the data corresponding to the access command, or both.

By way of example, the process flow 300 may include receiving a write command. For example, at 305, the memory system may receive a command to store data from a host system. Accordingly, the process flow 300 may include storing the data associated with the command. For example, at 310, the memory system may store the data associated with the command at an SLC block of the memory system. In some cases, as part of storing the data, the memory system may update a quantity corresponding to an amount of available space of the memory system.

In some cases, the process flow 300 may include determining whether to initiate a data transfer operation. For example, at 315, the memory system may determine whether a parameter associated with the memory system satisfies a threshold. In some cases, the parameter may correspond to the amount of available space of the memory system. That is, the memory system may initiate the data transfer operation if a threshold quantity of SLC blocks have been written to. In some cases, transferring data from one or more SLC blocks to one or more multiple level cell blocks may increase the amount of available space of the memory system, for example by freeing the one or more SLC blocks. Additionally or alternatively, the memory system may determine to initiate the data transfer if the memory system is in an idle state. For example, if the memory system detects that an access command has not been received for a threshold duration of time, the memory system may initiate an idle state (e.g., to conserve power or other system resources). As part of the idle state, the memory system may initiate the data transfer operation.

In some cases, in response to determining to initiate the data transfer operation, the process flow 300 may include selecting a source set of memory cells. For example, at 320, the memory system may select a first source block from the SLC memory cells of the memory system. In some cases, to select the source set of memory cells, the memory system may, at 325, identify a counter value, such as a read count, for one or more SLC blocks of the memory system. Accordingly, the memory system may select a source block of the one or more SLC blocks with a lowest read count. Additionally or alternatively, the memory system may select a source block with a read count below a threshold. For example, the memory system may include a block threshold read count, and may consider data stored in a block of memory cells with a read count below the block threshold as cold. Accordingly, the memory system may select a first block with a higher read count over a second block with a lower read count if the first block falls below the block threshold.

The process flow 300 may include selecting a source page of memory cells. For example, at 330, the memory system may select a source page of the source block using the read count values corresponding to each page the source block. In some cases, the memory system may select a source page of the source block with a lowest read count. Additionally or alternatively, the memory system may select a source page with a read count below a threshold. For example, the memory system may include a page threshold read count, and may consider data stored in a block of memory cells with a read count below the page threshold as cold.

The process flow 300 may include selecting a destination set of memory cells. For example, at 335, the memory system may select a destination block from the multiple level cell blocks of the memory system. In some cases, the memory system may select a destination block with a lowest PEC. Additionally or alternatively, because the PEC of the multiple level cell blocks of the memory system may be substantially uniform (e.g., due to wear leveling operations), the memory system may select a destination block with a PEC which falls within a range.

In some cases, the memory system may further select a destination page of the destination block using a read duration of the pages of the destination block. By way of example, a set of memory cells corresponding to a page of the destination block may be configured to store multiple pages (e.g., if the destination block is a QLC block, the set of memory cells may be configured to store four pages). In some cases, each page associated with the set of memory cells may use a respective quantity of read strobes to access data stored in the respective page. That is, the memory system may use a first quantity of passes to access a first page, a second quantity of passes to access a second page, and so on. Accordingly, each page may be associated with a respective read duration corresponding to the quantity of strobes used to access data of the respective page. The memory system may select a destination page with a higher read duration prior to a destination page with a lower read duration, such that colder data is transferred to a slower destination page and hotter data (e.g., data stored in a source page with a higher read count) is transferred to a faster page.

The process flow 300 may include transferring the data. For example, at 340, the memory system may transfer data from the selected source block to the selected destination block. Additionally or alternatively, the memory system may transfer data from the selected source page to the selected destination page.

In some cases, process flow 300 may include determining whether a page transfer is complete. For example, the memory system may, at 345, determine whether each page of the selected source block has been transferred to the selected destination block. If each page has not been transferred, the memory system may select an additional source page (e.g., a source page with a next-lowest read count), an additional destination page (e.g., a destination page with a next-highest read duration), or both and transfer data from the additional source page to the additional destination page. The memory system may continue selecting source and destination pages using the associated read count and read duration values until each page of the source block has been transferred. In some cases, the as part of transferring the selected source block, the memory system may select an additional destination block (e.g., if the originally selected destination block becomes full).

In some cases, the process flow 300 may include determining whether a block transfer is complete. For example, the memory system may, at 350, determine whether data in each SLC block associated with the data transfer operation has been transferred to a multiple level cell block. If data in each block has not been transferred, the memory system may select an additional source block (e.g., a source block with a next-lowest read count), an additional destination block (e.g., a destination block with a next-lowest PEC), or both and transfer data from the additional source block to the additional destination block. The memory system may continue selecting source and destination blocks using the associated read count and PEC values until data in each SLC block associated with the data transfer operation has been transferred. Accordingly, the memory system may, at 355, complete the data transfer operation.

Aspects of the process flow 300 may be implemented by a controller, among other components. Additionally or alternatively, aspects of the process flow 300 may be implemented as instructions stored in memory (e.g., firmware stored in a memory coupled with the host system or the memory system). For example, the instructions, when executed by a controller, may cause the controller to perform the operations of the process flow 300.

Figure 4:
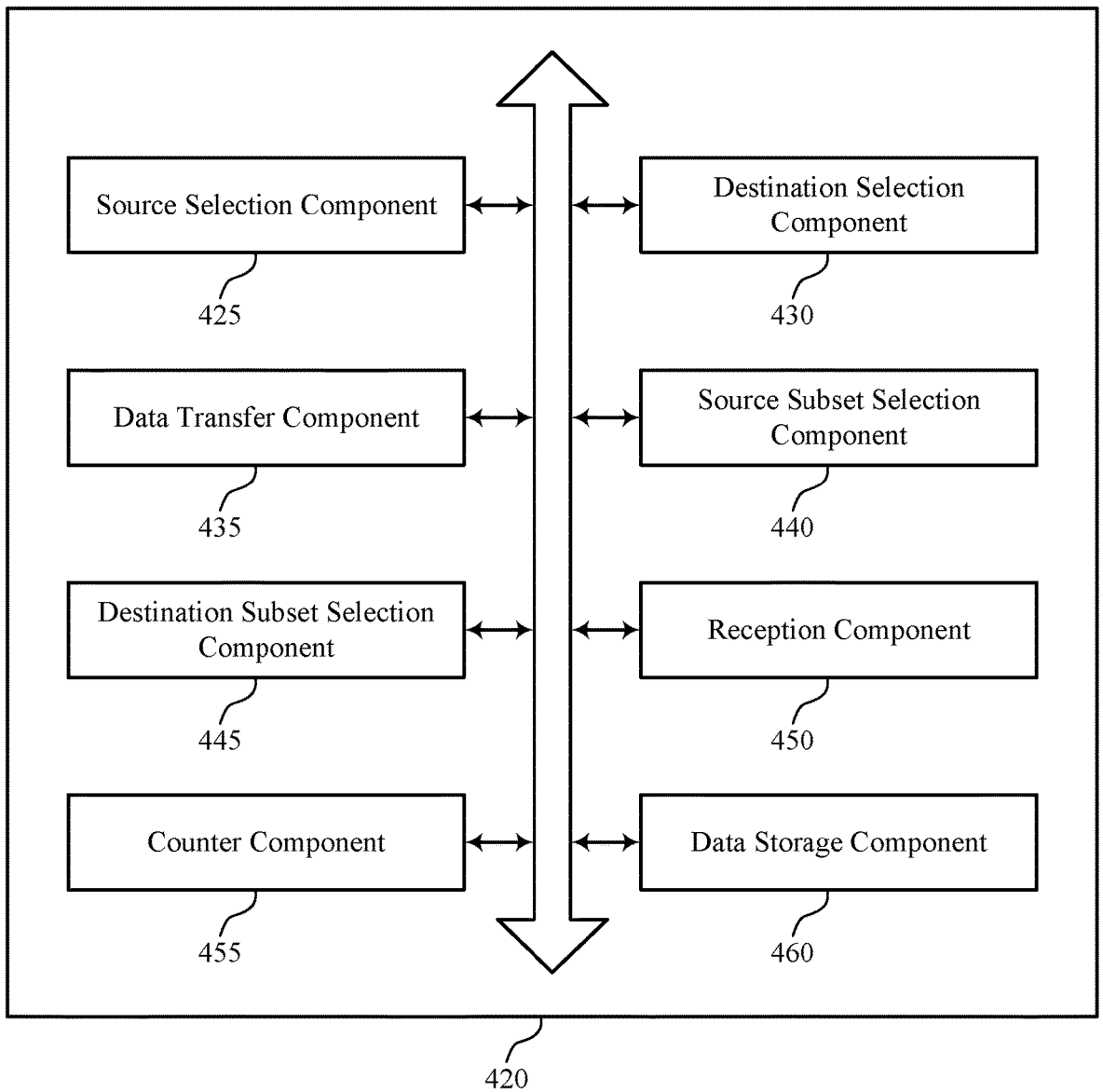
FIG. 4 shows a block diagram of a memory system that supports techniques for data transfer operations in accordance with examples as disclosed herein.

FIG. 4 shows a block diagram 400 of a memory system 420 that supports techniques for data transfer operations in accordance with examples as disclosed herein. The memory system 420 may be an example of aspects of a memory system as described with reference to FIGS. 1 through 3. The memory system 420, or various components thereof, may be an example of means for performing various aspects of techniques for data transfer operations as described herein. For example, the memory system 420 may include a source selection component 425, a destination selection component 430, a data transfer component 435, a source subset selection component 440, a destination subset selection component 445, a reception component 450, a counter component 455, a data storage component 460, or any combination thereof. Each of these components may communicate, directly or indirectly, with one another (e.g., via one or more buses).

The source selection component 425 may be configured as or otherwise support a means for selecting, as part of a data relocation operation, a first plurality of memory cells of a memory system based at least in part on a first value of a first counter associated with a first quantity of access operations performed on the first plurality of memory cells. The destination selection component 430 may be configured as or otherwise support a means for selecting, as part of the data relocation operation, a second plurality of memory cells based at least in part on a second value of a second counter associated with a second quantity of access operations for the second plurality of memory cells. The data transfer component 435 may be configured as or otherwise support a means for transferring data from the first plurality of memory cells to the second plurality of memory cells based at least in part on selecting the first plurality of memory cells and the second plurality of memory cells.

In some examples, the source selection component 425 may be configured as or otherwise support a means for selecting a third plurality of memory cells based at least in part on a value of a third counter associated with a quantity of access operations for the third plurality of memory cells, where the value of the third counter is greater than the value of the first counter. In some examples, the data transfer component 435 may be configured as or otherwise support a means for transfer second data from the third plurality of memory cells to a fourth plurality of memory cells based at least in part on selecting the third plurality of memory cells.

In some examples, the destination selection component 430 may be configured as or otherwise support a means for selecting the fourth plurality of memory cells based at least in part on a fourth value of a fourth counter associated with a fourth quantity of access operations performed on the fourth plurality of memory cells, where the fourth value is greater than the second value.

In some examples, the source subset selection component 440 may be configured as or otherwise support a means for selecting a first subset of the first plurality of memory cells based at least in part on a third value of a third counter associated with a quantity of access operations performed on the first subset. In some examples, the destination subset selection component 445 may be configured as or otherwise support a means for selecting a second subset of the second plurality of memory cells based at least in part on a first read duration associated with the second subset, where transferring data from the first plurality of memory cells to the second plurality of memory cells includes transferring data from the first subset to the second subset.

In some examples, the source subset selection component 440 may be configured as or otherwise support a means for selecting a third subset of the first plurality of memory cells based at least in part on a fourth value of a fourth counter associated with a quantity of access operations performed on the third subset, where the fourth value of the fourth counter is greater than the third value of the third counter. In some examples, the destination subset selection component 445 may be configured as or otherwise support a means for selecting a fourth subset of the second plurality of memory cells based at least in part on a second read duration associated with the fourth subset, where the second read duration is less than the first read duration and where transferring data from the first plurality of memory cells to the second plurality of memory cells includes transferring data from the third subset to the fourth subset.

In some examples, the first subset, the second subset, or both, each correspond to a respective page of memory cells.

In some examples, the reception component 450 may be configured as or otherwise support a means for receiving a read command for second data stored in the first plurality of memory cells. In some examples, the counter component 455 may be configured as or otherwise support a means for incrementing the first value of the first counter based at least in part on receiving the read command, where the first value of the first counter is stored in a volatile memory of the memory system.

In some examples, the data transfer component 435 may be configured as or otherwise support a means for transferring the first value of the first counter to a non-volatile memory of the memory system based at least in part on performing a power down operation.

In some examples, the data transfer component 435 may be configured as or otherwise support a means for determining whether a parameter associated with a plurality of blocks of memory cells of the memory system satisfies a threshold associated with the data relocation operation. In some examples, the data transfer component 435 may be configured as or otherwise support a means for initiating the data relocation operation based at least in part on determining that the parameter satisfies the threshold, where selecting the first plurality of memory cells is based at least in part on initiating the data relocation operation.

In some examples, the parameter includes an amount of available space of the memory system, an indication of an idle state, or both.

In some examples, the reception component 450 may be configured as or otherwise support a means for receiving, from a host system, a command to store second data in a block of memory cells of memory system. In some examples, the data storage component 460 may be configured as or otherwise support a means for storing the second data in the block of memory cells based at least in part on receiving the command. In some examples, the data transfer component 435 may be configured as or otherwise support a means for updating the parameter based at least in on storing the second data, where initiating the data relocation operation is based at least in part on updating the parameter.

In some examples, each memory cell of the first plurality of memory cells is configured to store one bit and each memory cell of the second plurality of memory cells is configured to store multiple bits.

In some examples, the first value corresponds to a quantity of read operations for the first plurality of memory cells and the second value corresponds to a quantity of write operations, a quantity of erase operations, or both, for the second plurality of memory cells.

In some examples, selecting the second plurality of memory cells is further based at least in part on a read duration associated with the second plurality of memory cells.

In some examples, the read duration is based at least in part on a quantity of strobes used to read the second plurality of memory cells.

In some examples, the first plurality of memory cells, the second plurality of memory cells, or both each correspond to a respective block of memory cells.

In some examples, the data transfer component 435 may be configured as or otherwise support a means for determining whether a parameter associated with a plurality of blocks of memory cells of a memory system satisfies a threshold associated with a data relocation operation. In some examples, the source selection component 425 may be configured as or otherwise support a means for selecting, based at least in part on determining that the parameter satisfies the threshold, a first page of memory cells of a first block of memory cells of the plurality of blocks of memory cells based at least in part on a first value of a first counter associated with a quantity of read operations for the first page of memory cells. In some examples, the data transfer component 435 may be configured as or otherwise support a means for transferring, as part of the data relocation operation, first data from the first page of memory cells to a second block of memory cells based at least in part on selecting the first page of memory cells.

In some examples, the source selection component 425 may be configured as or otherwise support a means for selecting, based at least in part on transferring the first data from the first page of memory cells to the second block of memory cells, a second page of memory cells of the first block of memory cells based at least in part on a second value of a second counter associated with a second quantity of read operations for the second page of memory cells, the second value greater than the first value. In some examples, the data transfer component 435 may be configured as or otherwise support a means for transferring, based at least in part on selecting the second page of memory cells, second data from the second page of memory cells to the second block of memory cells.

In some examples, transferring the first data includes storing the first data in a set of memory cells of the second block of memory cells and transferring the second data includes storing the second data in the set of memory cells.

In some examples, the data transfer component 435 may be configured as or otherwise support a means for determining whether a parameter associated with a plurality of blocks of memory cells of a memory system satisfies a threshold associated with a data relocation operation. In some examples, the destination selection component 430 may be configured as or otherwise support a means for selecting, based at least in part on determining that the parameter satisfies the threshold, a first page of memory cells of a first block of memory cells of the plurality of blocks of memory cells based at least in part on a second parameter associated with the first block. In some examples, the data transfer component 435 may be configured as or otherwise support a means for transferring, as part of the data relocation operation, first data from a second block of memory cells to the first page of memory cells based at least in part on selecting the first page of memory cells.

In some examples, the second parameter includes a second value of a second counter associated with a quantity of write operations performed on the first block.

In some examples, the second parameter includes a first read duration associated with the first page of memory cells.

In some examples, the first read duration is based at least in part on a quantity strobes used to read the first page of memory cells.

In some examples, the destination selection component 430 may be configured as or otherwise support a means for selecting, based at least in part on transferring the first data from the first page of memory cells to the second block of memory cells, a second page of memory cells of the first block of memory cells based at least in part on a second read duration, the second read duration less than the first read duration. In some examples, the data transfer component 435 may be configured as or otherwise support a means for transferring, based at least in part on selecting the second page of memory cells, second data from the second block of memory cells to the second page of memory cells.

In some examples, the first page and the second page correspond to a same set of memory cells.

Figure 5:
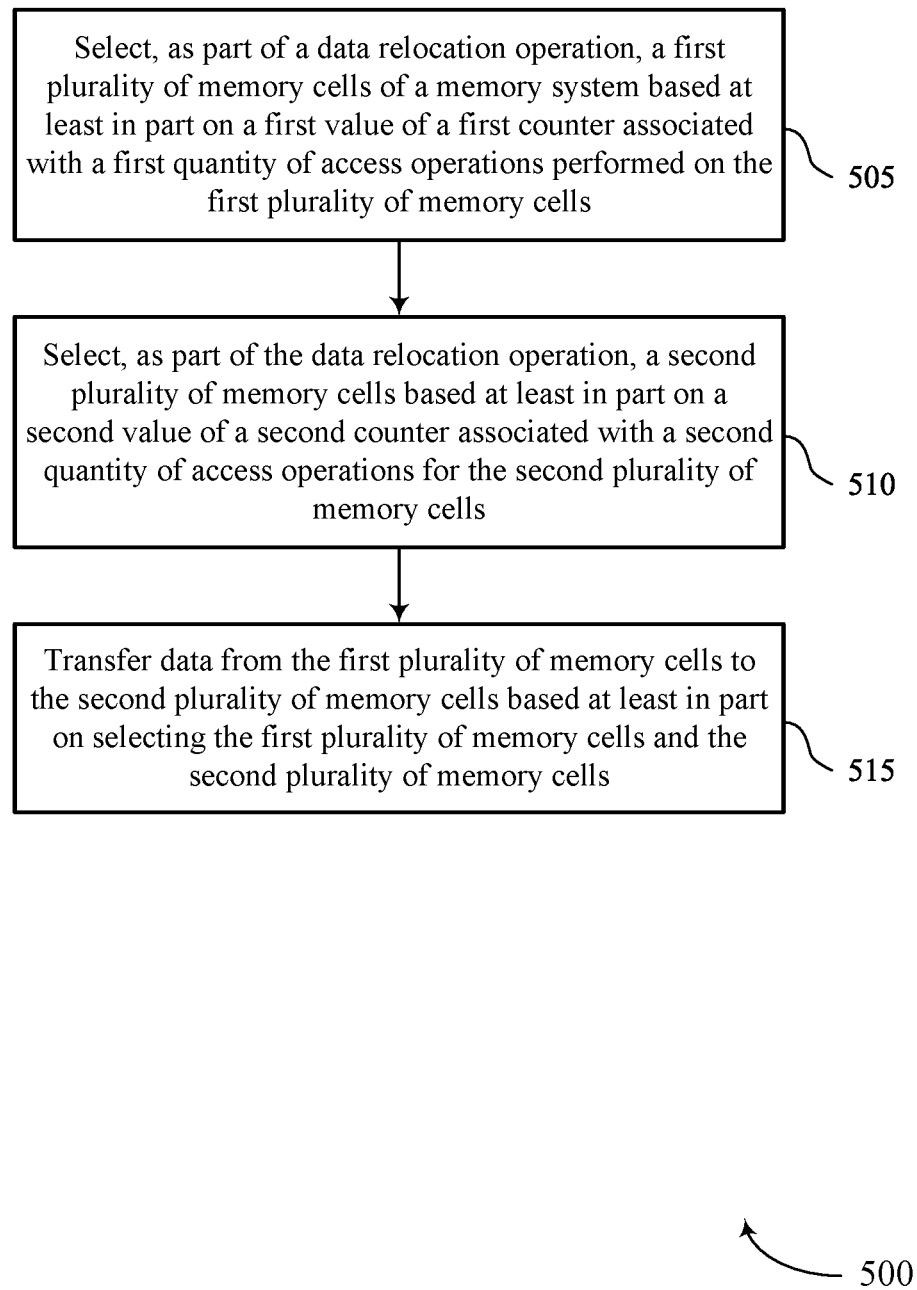
FIGS. 5 through 7 show flowcharts illustrating a method or methods that support techniques for data transfer operations in accordance with examples as disclosed herein.

FIG. 5 shows a flowchart illustrating a method 500 that supports techniques for data transfer operations in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include selecting, as part of a data relocation operation, a first plurality of memory cells of a memory system based at least in part on a first value of a first counter associated with a first quantity of access operations performed on the first plurality of memory cells. The operations of 505 may be performed in accordance with examples as disclosed herein. In some examples, aspects of the operations of 505 may be performed by a source selection component 425 as described with reference to FIG. 4.

At 510, the method may include selecting, as part of the data relocation operation, a second plurality of memory cells based at least in part on a second value of a second counter associated with a second quantity of access operations for the second plurality of memory cells. The operations of 510 may be performed in accordance with examples as disclosed herein. In some examples, aspects of the operations of 510 may be performed by a destination selection component 430 as described with reference to FIG. 4.

At 515, the method may include transferring data from the first plurality of memory cells to the second plurality of memory cells based at least in part on selecting the first plurality of memory cells and the second plurality of memory cells. The operations of 515 may be performed in accordance with examples as disclosed herein. In some examples, aspects of the operations of 515 may be performed by a data transfer component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for selecting, as part of a data relocation operation, a first plurality of memory cells of a memory system based at least in part on a first value of a first counter associated with a first quantity of access operations performed on the first plurality of memory cells; selecting, as part of the data relocation operation, a second plurality of memory cells based at least in part on a second value of a second counter associated with a second quantity of access operations for the second plurality of memory cells; and transferring data from the first plurality of memory cells to the second plurality of memory cells based at least in part on selecting the first plurality of memory cells and the second plurality of memory cells.

Aspect 2: The method, apparatus, or non-transitory computer-readable medium of aspect 1, further including operations, features, circuitry, logic, means, or instructions, or any combination thereof for selecting a third plurality of memory cells based at least in part on a value of a third counter associated with a quantity of access operations for the third plurality of memory cells, where the value of the third counter is greater than the value of the first counter and transfer second data from the third plurality of memory cells to a fourth plurality of memory cells based at least in part on selecting the third plurality of memory cells.

Aspect 3: The method, apparatus, or non-transitory computer-readable medium of aspect 2, further including operations, features, circuitry, logic, means, or instructions, or any combination thereof for selecting the fourth plurality of memory cells based at least in part on a fourth value of a fourth counter associated with a fourth quantity of access operations performed on the fourth plurality of memory cells, where the fourth value is greater than the second value.

Aspect 4: The method, apparatus, or non-transitory computer-readable medium of any of aspects 1 through 3, further including operations, features, circuitry, logic, means, or instructions, or any combination thereof for selecting a first subset of the first plurality of memory cells based at least in part on a third value of a third counter associated with a quantity of access operations performed on the first subset and selecting a second subset of the second plurality of memory cells based at least in part on a first read duration associated with the second subset, where transferring data from the first plurality of memory cells to the second plurality of memory cells includes transferring data from the first subset to the second subset.

Aspect 5: The method, apparatus, or non-transitory computer-readable medium of aspect 4, further including operations, features, circuitry, logic, means, or instructions, or any combination thereof for selecting a third subset of the first plurality of memory cells based at least in part on a fourth value of a fourth counter associated with a quantity of access operations performed on the third subset, where the fourth value of the fourth counter is greater than the third value of the third counter and selecting a fourth subset of the second plurality of memory cells based at least in part on a second read duration associated with the fourth subset, where the second read duration is less than the first read duration and where transferring data from the first plurality of memory cells to the second plurality of memory cells includes transferring data from the third subset to the fourth subset.

Aspect 6: The method, apparatus, or non-transitory computer-readable medium of any of aspects 4 through 5 where the first subset, the second subset, or both, each correspond to a respective page of memory cells.

Aspect 7: The method, apparatus, or non-transitory computer-readable medium of any of aspects 1 through 6, further including operations, features, circuitry, logic, means, or instructions, or any combination thereof for receiving a read command for second data stored in the first plurality of memory cells and incrementing the first value of the first counter based at least in part on receiving the read command, where the first value of the first counter is stored in a volatile memory of the memory system.

Aspect 8: The method, apparatus, or non-transitory computer-readable medium of aspect 7, further including operations, features, circuitry, logic, means, or instructions, or any combination thereof for transferring the first value of the first counter to a non-volatile memory of the memory system based at least in part on performing a power down operation.

Aspect 9: The method, apparatus, or non-transitory computer-readable medium of any of aspects 1 through 8, further including operations, features, circuitry, logic, means, or instructions, or any combination thereof for determining whether a parameter associated with a plurality of blocks of memory cells of the memory system satisfies a threshold associated with the data relocation operation and initiating the data relocation operation based at least in part on determining that the parameter satisfies the threshold, where selecting the first plurality of memory cells is based at least in part on initiating the data relocation operation.

Aspect 10: The method, apparatus, or non-transitory computer-readable medium of aspect 9 where the parameter includes an amount of available space of the memory system, an indication of an idle state, or both.

Aspect 11: The method, apparatus, or non-transitory computer-readable medium of any of aspects 9 through 10, further including operations, features, circuitry, logic, means, or instructions, or any combination thereof for receiving, from a host system, a command to store second data in a block of memory cells of memory system; storing the second data in the block of memory cells based at least in part on receiving the command; and updating the parameter based at least in on storing the second data, where initiating the data relocation operation is based at least in part on updating the parameter.

Aspect 12: The method, apparatus, or non-transitory computer-readable medium of any of aspects 1 through 11 where each memory cell of the first plurality of memory cells is configured to store one bit and each memory cell of the second plurality of memory cells is configured to store multiple bits.

Aspect 13: The method, apparatus, or non-transitory computer-readable medium of any of aspects 1 through 12 where the first value corresponds to a quantity of read operations for the first plurality of memory cells and the second value corresponds to a quantity of write operations, a quantity of erase operations, or both, for the second plurality of memory cells.

Aspect 14: The method, apparatus, or non-transitory computer-readable medium of any of aspects 1 through 13 where selecting the second plurality of memory cells is further based at least in part on a read duration associated with the second plurality of memory cells.

Aspect 15: The method, apparatus, or non-transitory computer-readable medium of aspect 14 where the read duration is based at least in part on a quantity of strobes used to read the second plurality of memory cells.

Aspect 16: The method, apparatus, or non-transitory computer-readable medium of any of aspects 1 through 15 where the first plurality of memory cells, the second plurality of memory cells, or both each correspond to a respective block of memory cells.

Figure 6:
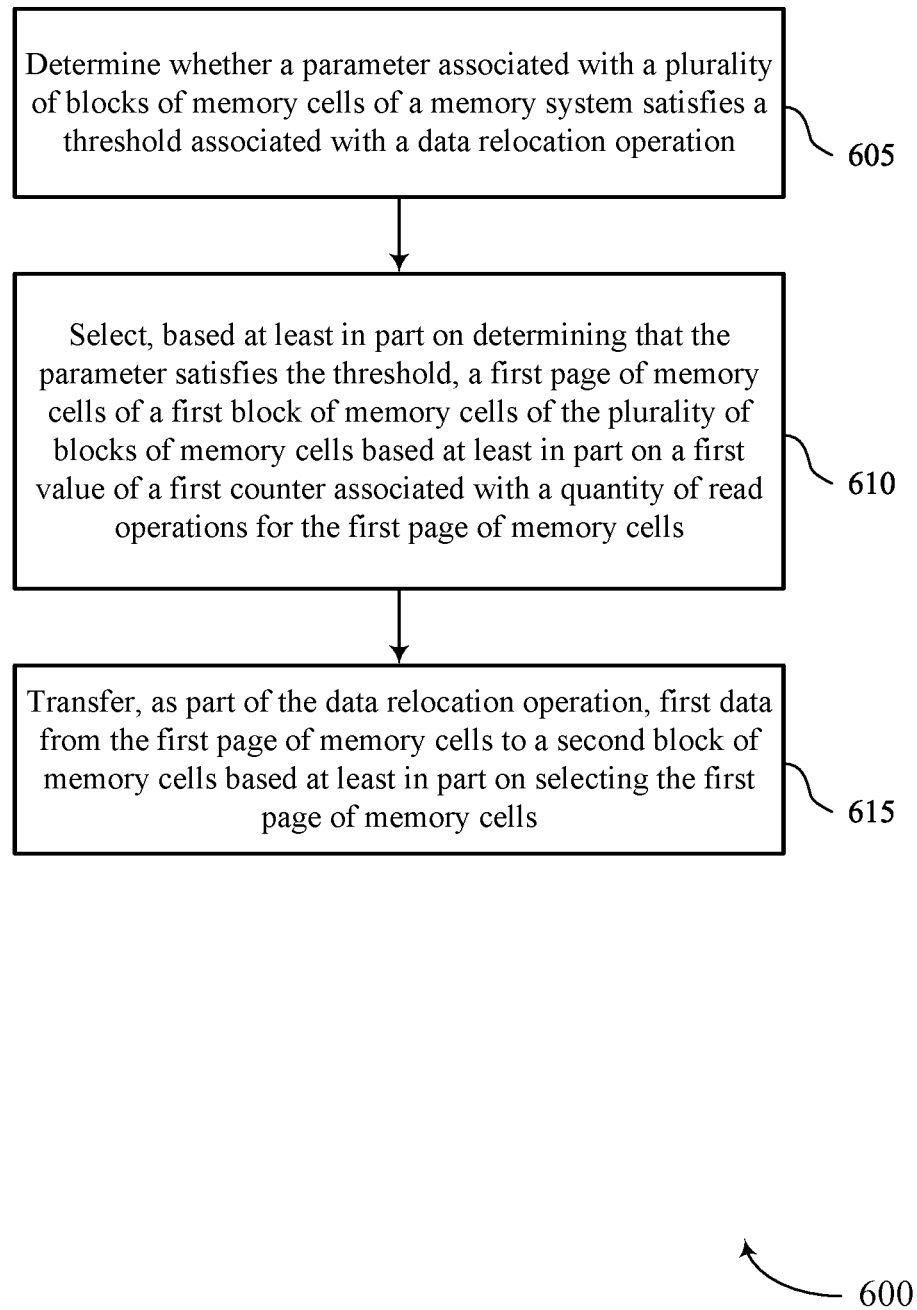

FIG. 6 shows a flowchart illustrating a method 600 that supports techniques for data transfer operations in accordance with examples as disclosed herein. The operations of method 600 may be implemented by a memory system or its components as described herein. For example, the operations of method 600 may be performed by a memory system as described with reference to FIG. 1 through 4. In some examples, a memory system may execute a set of instructions to control the functional elements of the device to perform the described functions. Additionally, or alternatively, the memory system may perform aspects of the described functions using special-purpose hardware.

At 605, the method may include determining whether a parameter associated with a plurality of blocks of memory cells of a memory system satisfies a threshold associated with a data relocation operation. The operations of 605 may be performed in accordance with examples as disclosed herein. In some examples, aspects of the operations of 605 may be performed by a data transfer component 435 as described with reference to FIG. 4.

At 610, the method may include selecting, based at least in part on determining that the parameter satisfies the threshold, a first page of memory cells of a first block of memory cells of the plurality of blocks of memory cells based at least in part on a first value of a first counter associated with a quantity of read operations for the first page of memory cells. The operations of 610 may be performed in accordance with examples as disclosed herein. In some examples, aspects of the operations of 610 may be performed by a source selection component 425 as described with reference to FIG. 4.

At 615, the method may include transferring, as part of the data relocation operation, first data from the first page of memory cells to a second block of memory cells based at least in part on selecting the first page of memory cells. The operations of 615 may be performed in accordance with examples as disclosed herein. In some examples, aspects of the operations of 615 may be performed by a data transfer component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

- Aspect 17: A method, apparatus, or non-transitory computer-readable medium including operations, features, circuitry, logic, means, or instructions, or any combination thereof for determining whether a parameter associated with a plurality of blocks of memory cells of a memory system satisfies a threshold associated with a data relocation operation; selecting, based at least in part on determining that the parameter satisfies the threshold, a first page of memory cells of a first block of memory cells of the plurality of blocks of memory cells based at least in part on a first value of a first counter associated with a quantity of read operations for the first page of memory cells; and transferring, as part of the data relocation operation, first data from the first page of memory cells to a second block of memory cells based at least in part on selecting the first page of memory cells.

- Aspect 18: The method, apparatus, or non-transitory computer-readable medium of aspect 17, further including operations, features, circuitry, logic, means, or instructions, or any combination thereof for selecting, based at least in part on transferring the first data from the first page of memory cells to the second block of memory cells, a second page of memory cells of the first block of memory cells based at least in part on a second value of a second counter associated with a second quantity of read operations for the second page of memory cells, the second value greater than the first value and transferring, based at least in part on selecting the second page of memory cells, second data from the second page of memory cells to the second block of memory cells.

- Aspect 19: The method, apparatus, or non-transitory computer-readable medium of aspect 18 where transferring the first data includes storing the first data in a set of memory cells of the second block of memory cells and transferring the second data includes storing the second data in the set of memory cells.

Figure 7:
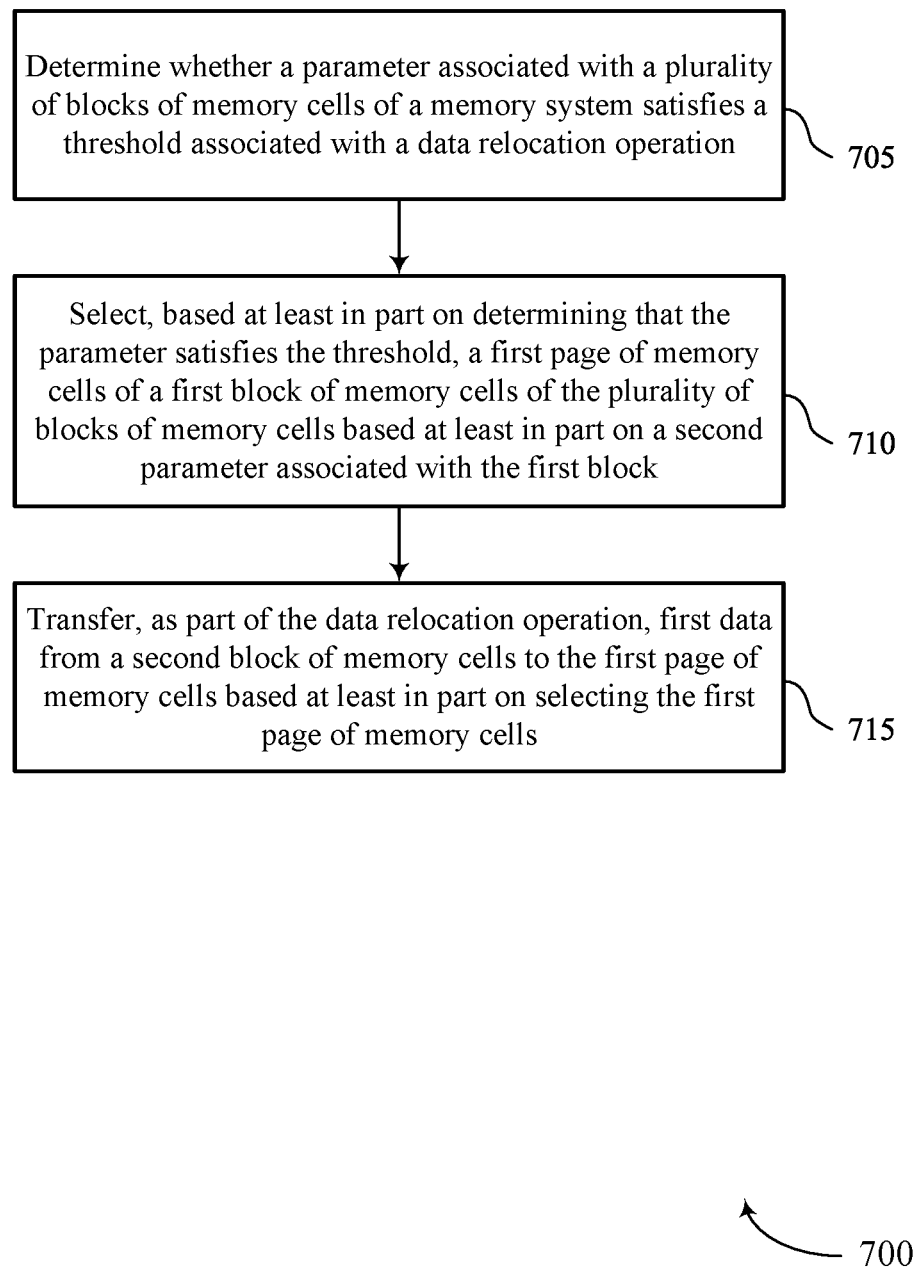

FIG. 7 shows a flowchart illustrating a method 700 that supports techniques for data transfer operations in accordance with examples as disclosed herein. The operations of method 700 may be implemented by a memory system or its components as described herein. For example, the operations of method 700 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 705, the method may include determining whether a parameter associated with a plurality of blocks of memory cells of a memory system satisfies a threshold associated with a data relocation operation. The operations of 705 may be performed in accordance with examples as disclosed herein. In some examples, aspects of the operations of 705 may be performed by a data transfer component 435 as described with reference to FIG. 4.

At 710, the method may include selecting, based at least in part on determining that the parameter satisfies the threshold, a first page of memory cells of a first block of memory cells of the plurality of blocks of memory cells based at least in part on a second parameter associated with the first block. The operations of 710 may be performed in accordance with examples as disclosed herein. In some examples, aspects of the operations of 710 may be performed by a destination selection component 430 as described with reference to FIG. 4.

At 715, the method may include transferring, as part of the data relocation operation, first data from a second block of memory cells to the first page of memory cells based at least in part on selecting the first page of memory cells. The operations of 715 may be performed in accordance with examples as disclosed herein. In some examples, aspects of the operations of 715 may be performed by a data transfer component 435 as described with reference to FIG. 4.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

- Aspect 20: A method, apparatus, or non-transitory computer-readable medium including operations, features, circuitry, logic, means, or instructions, or any combination thereof for determining whether a parameter associated with a plurality of blocks of memory cells of a memory system satisfies a threshold associated with a data relocation operation; selecting, based at least in part on determining that the parameter satisfies the threshold, a first page of memory cells of a first block of memory cells of the plurality of blocks of memory cells based at least in part on a second parameter associated with the first block; and transferring, as part of the data relocation operation, first data from a second block of memory cells to the first page of memory cells based at least in part on selecting the first page of memory cells.

- Aspect 21: The method, apparatus, or non-transitory computer-readable medium of aspect 20 where the second parameter includes a second value of a second counter associated with a quantity of write operations performed on the first block.

- Aspect 22: The method, apparatus, or non-transitory computer-readable medium of any of aspects 20 through 21 where the second parameter includes a first read duration associated with the first page of memory cells.

- Aspect 23: The method, apparatus, or non-transitory computer-readable medium of aspect 22 where the first read duration is based at least in part on a quantity strobes used to read the first page of memory cells.

Aspect 24: The method, apparatus, or non-transitory computer-readable medium of any of aspects 22 through 23, further including operations, features, circuitry, logic, means, or instructions, or any combination thereof for selecting, based at least in part on transferring the first data from the first page of memory cells to the second block of memory cells, a second page of memory cells of the first block of memory cells based at least in part on a second read duration, the second read duration less than the first read duration and transferring, based at least in part on selecting the second page of memory cells, second data from the second block of memory cells to the second page of memory cells.

Aspect 25: The method, apparatus, or non-transitory computer-readable medium of aspect 24 where the first page and the second page correspond to a same set of memory cells.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on or in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
      select, as part of a data relocation operation to transfer data from a first plurality of memory cells, each memory cell of the first plurality of memory cells configured to store a first quantity of bits, to a second plurality of memory cells, each memory cell of the second plurality of memory cells configured to store a second quantity of bits greater than the first quantity of bits, the first plurality of memory cells of the memory system comprising the one or more memory devices based at least in part on a first value of a first counter associated with a first quantity of access operations performed on the first plurality of memory cells;
      select, as part of the data relocation operation, the second plurality of memory cells based at least in part on a second value of a second counter associated with a second quantity of access operations for the second plurality of memory cells and a first read duration associated with the second plurality of memory cells; and
      transfer data from the first plurality of memory cells to the second plurality of memory cells based at least in part on selecting the first plurality of memory cells and the second plurality of memory cells.

2. The memory system of claim 1, wherein the processing circuitry is further configured to cause the memory system to:
   select a third plurality of memory cells based at least in part on a value of a third counter associated with a quantity of access operations for the third plurality of memory cells, wherein the value of the third counter is greater than the value of the first counter; and
   transfer second data from the third plurality of memory cells to a fourth plurality of memory cells based at least in part on selecting the third plurality of memory cells.

3. The memory system of claim 2, wherein the processing circuitry is further configured to cause the memory system to:
  select the fourth plurality of memory cells based at least in part on a fourth value of a fourth counter associated with a fourth quantity of access operations performed on the fourth plurality of memory cells, wherein the fourth value is greater than the second value.

4. The memory system of claim 1, wherein the processing circuitry is further configured to cause the memory system to:
  select a first subset of the first plurality of memory cells based at least in part on a third value of a third counter associated with a quantity of access operations performed on the first subset; and
  select a second subset of the second plurality of memory cells based at least in part on a second read duration associated with the second subset, wherein transferring data from the first plurality of memory cells to the second plurality of memory cells comprises transferring data from the first subset to the second subset.

5. The memory system of claim 4, wherein the processing circuitry is further configured to cause the memory system to:
  select a third subset of the first plurality of memory cells based at least in part on a fourth value of a fourth counter associated with a quantity of access operations performed on the third subset, wherein the fourth value of the fourth counter is greater than the third value of the third counter; and
  select a fourth subset of the second plurality of memory cells based at least in part on a third read duration associated with the fourth subset, wherein the third read duration is less than the second read duration and wherein transferring data from the first plurality of memory cells to the second plurality of memory cells comprises transferring data from the third subset to the fourth subset.

6. The memory system of claim 4, wherein the first subset, the second subset, or both, each correspond to a respective page of memory cells.

7. The memory system of claim 1, wherein the processing circuitry is further configured to cause the memory system to:
  receive a read command for second data stored in the first plurality of memory cells; and
  increment the first value of the first counter based at least in part on receiving the read command, wherein the first value of the first counter is stored in a volatile memory of the memory system.

8. The memory system of claim 7, wherein the processing circuitry is further configured to cause the memory system to:
  transfer the first value of the first counter to a non-volatile memory of the memory system based at least in part on performing a power down operation.

9. The memory system of claim 1, wherein the processing circuitry is further configured to cause the memory system to:
  determine whether a parameter associated with a plurality of blocks of memory cells of the memory system satisfies a threshold associated with the data relocation operation; and
  initiate the data relocation operation based at least in part on determining that the parameter satisfies the threshold, wherein selecting the first plurality of memory cells is based at least in part on initiating the data relocation operation.

10. The memory system of claim 9, wherein the parameter comprises an amount of available space of the memory system, an indication of an idle state, or both.

11. The memory system of claim 9, wherein the processing circuitry is further configured to cause the memory system to:
  receive, from a host system, a command to store second data in a block of memory cells of the memory system,
  store the second data in the block of memory cells based at least in part on receiving the command; and
  update the parameter based at least in part on storing the second data, wherein initiating the data relocation operation is based at least in part on updating the parameter.

12. The memory system of claim 1, wherein each memory cell of the first plurality of memory cells is configured to store one bit and each memory cell of the second plurality of memory cells is configured to store multiple bits.

13. The memory system of claim 1, wherein the first value corresponds to a quantity of read operations for the first plurality of memory cells and the second value corresponds to a quantity of write operations, a quantity of erase operations, or both, for the second plurality of memory cells.

14. The memory system of claim 1, wherein the first read duration is based at least in part on a quantity of strobes used to read the second plurality of memory cells.

15. The memory system of claim 1, wherein:
  the first plurality of memory cells, the second plurality of memory cells, or both each correspond to a respective block of memory cells.

16. A memory system, comprising:
  one or more memory devices; and
  processing circuitry coupled with the one or more memory devices and configured to cause the memory system to:
    determine whether a parameter associated with a plurality of blocks of memory cells of the memory system comprising the one or more memory devices satisfies a threshold associated with a data relocation operation to transfer data from a first block of memory cells, each memory cell of the first block configured to store a first quantity of bits, to a second block of memory cells, each memory cell of the second block configured to store a second quantity of bits greater than the first quantity of bits;
    select, based at least in part on determining that the parameter satisfies the threshold, a first page of memory cells of the first block of memory cells of the plurality of blocks of memory cells based at least in part on a first value of a first counter associated with a quantity of read operations for the first page of memory cells; and
    transfer, as part of the data relocation operation, first data from the first page of memory cells to the second block of memory cells based at least in part on selecting the first page of memory cells and a first read duration associated with the second block of memory cells.

17. The memory system of claim 16, wherein the processing circuitry is further configured to cause the memory system to:
  select, based at least in part on transferring the first data from the first page of memory cells to the second block of memory cells, a second page of memory cells of the first block of memory cells based at least in part on a second value of a second counter associated with a second quantity of read operations for the second page of memory cells, the second value greater than the first value; and transfer, based at least in part on selecting the second page of memory cells, second data from the second page of memory cells to the second block of memory cells.

18. The memory system of claim 17, wherein transferring the first data comprises storing the first data in a set of memory cells of the second block of memory cells and transferring the second data comprises storing the second data in the set of memory cells.

19. A memory system, comprising:
one or more memory devices; and
processing circuitry coupled with the one or more memory devices and configured to cause the memory system to:
determine whether a parameter associated with a plurality of blocks of memory cells of the memory system comprising the one or more memory devices satisfies a threshold associated with a data relocation operation to transfer data from a second block of memory cells, each memory cell of the second block configured to store a first quantity of bits, to a first block of memory cells, each memory cell of the first block configured to store a second quantity of bits greater than the first quantity of bits;
select, based at least in part on determining that the parameter satisfies the threshold, a first page of memory cells of the first block of memory cells of the plurality of blocks of memory cells based at least in part on a second parameter associated with the first block, wherein the second parameter comprises a first read duration associated with the first block; and transfer, as part of the data relocation operation, first data from the second block of memory cells to the first page of memory cells based at least in part on selecting the first page of memory cells.

20. The memory system of claim 19, wherein the second parameter further comprises a second value of a second counter associated with a quantity of write operations performed on the first block.

21. The memory system of claim 19, wherein the first read duration is based at least in part on a quantity of strobes used to read the first page of memory cells.

22. The memory system of claim 19, wherein the processing circuitry is further configured to cause the memory system to:
select, based at least in part on transferring the first data from the second block of memory cells to the first page of memory cells, a second page of memory cells of the first block of memory cells based at least in part on a second read duration, the second read duration less than the first read duration; and
transfer, based at least in part on selecting the second page of memory cells, second data from the second block of memory cells to the second page of memory cells.

23. The memory system of claim 22, wherein the first page and the second page correspond to a same set of memory cells.

* * * * *